US006697610B1

(12) United States Patent
Tait

(10) Patent No.: US 6,697,610 B1

(45) Date of Patent: Feb. 24, 2004

(54) SMART ANTENNA FOR RF RECEIVERS

(75) Inventor: David S. Tait, Wood Dale, IL (US)

(73) Assignee: Zenith Electronics Corporation, Lincolnshire, IL (US)

(*) Notice: Subject to any disclaimer, the term of this patent is extended or adjusted under 35 U.S.C. 154(b) by 0 days.

(21) Appl. No.: 09/595,068

(22) Filed: Jun. 15, 2000

(51) Int. Cl.[7] .................................................. H04B 7/00

(52) U.S. Cl. ................................ 455/277.1; 455/151.1; 342/359; 318/280; 318/467

(58) Field of Search .............................. 455/562, 226.1, 455/67.1, 272, 277.1, 130, 134, 135, 562.1; 342/423, 425, 426, 359; 318/280, 281, 282, 467

(56) References Cited

U.S. PATENT DOCUMENTS 3,691,444 A * 9/1972 Juroff et al. ................ 318/467
4,047,175 A * 9/1977 Taira et al. ................. 342/359
4,359,760 A * 11/1982 Holmes ...................... 348/614
4,796,032 A * 1/1989 Sakurai et al. .............. 342/359
4,801,940 A * 1/1989 Ma et al. .................... 342/359
5,300,935 A * 4/1994 Yu ............................ 342/359
5,347,286 A * 9/1994 Babitch ...................... 342/359
5,760,819 A * 6/1998 Sklar et al. .................... 348/8
6,016,120 A * 1/2000 McNabb et al. ....... 342/357.06
6,075,330 A * 6/2000 Terk .......................... 318/280
6,229,480 B1 * 5/2001 Shintani ..................... 342/359
6,239,767 B1 * 5/2001 Rossi et al. ............. 244/158 R
6,317,096 B1 * 11/2001 Daginnus et al. ........... 343/712

* cited by examiner

*Primary Examiner*—Sonny Trinh

(57) ABSTRACT

A controller controls the automatic positioning of an antenna. The controller is arranged to position the antenna dependent upon a channel selected by a user, a location of a receiver tuned to the selected channel, and a location of a source of a signal associated with the selected channel.

24 Claims, 1 Drawing Sheet

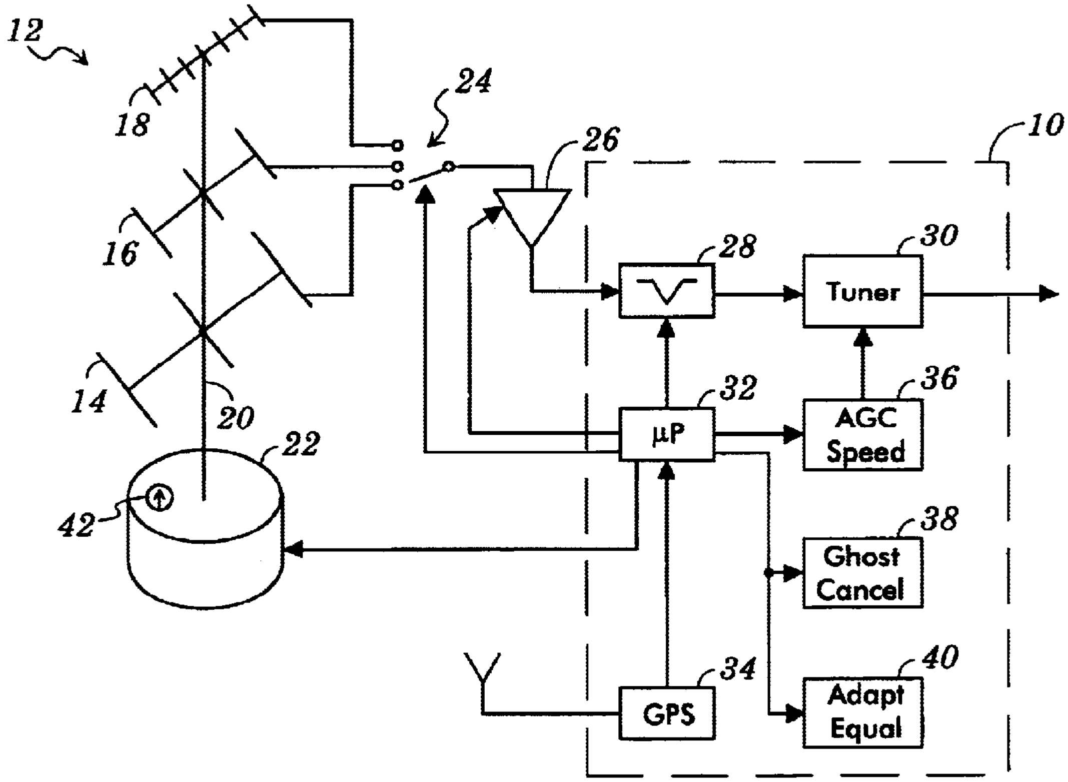
12
18
24
26
10
16
28
30
Tuner
14
20
22
32
μP
36
AGC
Speed
42
38
Ghost
Cancel
34
GPS
40
Adapt
Equal

SMART ANTENNA FOR RF RECEIVERS

TECHNICAL FIELD OF THE INVENTION

The present invention relates to the automatic positioning of an antenna in response to channel selection.

BACKGROUND OF THE INVENTION AND PRIOR ART

Antennas are provided as accessories of RF receivers in order to provide the receivers with the capability of receiving RF signals that are transmitted over the air. Typical antennas that are used in connection with RF receivers, such as televisions, are more sensitive to the signal emitted by a transmitter in some orientations than in others. Thus, when installing an antenna in an area serviced by a plurality of transmitters, the antenna is moved to various orientations in an effort to find the one orientation that provides acceptable reception from all appropriate transmitters.

Unfortunately, while one orientation is best for one transmitter, that orientation is seldom best for other transmitters. This problem escalates as the number of possible transmitters increases. Accordingly, it is known to provide antennas with motors that may be remotely controlled by a user. Thus, when the user selects an RF channel for reception, the user remotely controls the motor in order to rotate the antenna until reception by the RF receiver is optimized. This manual approach to the aiming of an antenna is time consuming because the acquisition of optimized reception usually requires a trial and error manual rotation of the antenna each time that a new channel is selected.

The present invention is directed to the automatic rotation of an antenna.

SUMMARY OF THE INVENTION

In accordance with a first aspect of the invention, a system for automatically positioning an antenna comprises a motor and a controller. The motor is arranged to be coupled to the antenna. The controller is coupled to the motor, and the controller is arranged to control the motor in response to selection of a channel so as to automatically drive the antenna to a position at which the antenna is aimed at a source of a signal associated with the selected channel. The controller drives the motor to the position based upon a location of the signal source and a location of the antenna.

In accordance with another aspect of the invention, a controller controls the automatic positioning of an antenna. The controller is arranged to drive the antenna to a position dependent upon (i) a channel selected by a user, (ii) a location of the antenna, and (iii) a location of a source of a signal associated with the selected channel.

In accordance with still another aspect of the invention, a method of positioning an antenna comprises a) automatically computing a path through which an antenna is to be moved from a first position to a second position, wherein the automatic computation is based upon a location of a remote source corresponding to a channel to which a tuner is tuned by a user and upon a location of the tuner, wherein the first position of the antenna is a current position of the antenna, and wherein the second position of the antenna is a position at which the antenna is aimed at the remote source, and b) moving the antenna through the automatically computed path.

BRIEF DESCRIPTION OF THE DRAWINGS

These and other features and advantages of the invention will be apparent upon reading the following description in conjunction with the single figure of the drawing which illustrates an exemplary automatic antenna rotation arrangement according to an embodiment of the present invention.

DESCRIPTION OF THE INVENTION

As shown in the drawing, an RF receiver 10, such as a television, is provided with an antenna array 12. The antenna array 12 includes a low VHF antenna 14, a high VHF antenna 16, and a UHF antenna 18. The low VHF antenna 14, the high VHF antenna 16, and the UHF antenna 18 are mechanically mounted on a common mast 20 driven by a motor 22. Accordingly, when the motor 22 is energized, it drives the common mast 20 in order to rotate the low VHF antenna 14, the high VHF antenna 16, and the UHF antenna 18 in unison.

Each of the low VHF antenna 14, the high VHF antenna 16, and the UHF antenna 18 is electrically coupled to a switch 24. Depending upon the channel selected by the user, the switch 24 selectively couples one of the low VHF antenna 14, the high VHF antenna 16, and the UHF antenna 18 to a low noise, variable gain amplifier 26 whose output is electrically coupled to a variable frequency FM trap 28 of the RF receiver 10. The variable frequency FM trap 28 notches out signals from any unwanted FM station in the receiving path of the antenna corresponding to a selected channel. The variable frequency FM trap 28 provides the signal from the selected one of the low VHF antenna 14, the high VHF antenna 16, and the UHF antenna 18 to a tuner 30 of the RF receiver 10. The tuner 30 tunes to the channel selected by the user of the RF receiver 10 under control of a microprocessor 32.

The microprocessor 32 stores the known locations of all wanted transmitters providing RF signals that can be received by the RF receiver 10. For example, the microprocessor 32 may store these locations in memory by latitude and longitude. A global position sensor 34 is provided with the RF receiver 10. Accordingly, when the user selects a channel corresponding to one of the known transmitters whose location is stored in memory by the microprocessor 32, the microprocessor 32 operates the switch 24 to select the one of the low VHF antenna 14, the high VHF antenna 16, and the UHF antenna 18 which is appropriate to the selected channel. The microprocessor 32 also calculates an angle of rotation based upon the stored global location of the transmitter corresponding to the selected channel and upon the global position of the RF receiver 10 as provided by the global position sensor 34. The microprocessor 32 then drives the motor 22 to rotate the low VHF antenna 14, the high VHF antenna 16, and the UHF antenna 18 of the antenna array 12 through that angle of rotation so that the antenna corresponding to the selected channel is aimed at the transmitter transmitting the signal for that selected channel.

The microprocessor 32 can also store the locations of all known FM stations as well as other offending sources. Accordingly, when the microprocessor 32 causes the low VHF antenna 14, the high VHF antenna 16, and the UHF antenna 18 to be aimed at a transmitter corresponding to a selected channel, the microprocessor 32 also controls the variable frequency FM trap 28 to notch out the signal from any unwanted FM station that is effectively in the receiving path of the positioned antenna.

Similarly, the microprocessor 32 can also store the locations of airports and geographical topography. Accordingly, when the microprocessor 32 causes the low VHF antenna 14, the high VHF antenna 16, and the UHF antenna 18 to be aimed at a transmitter corresponding to a selected channel, the microprocessor 32 also increases AGC speed through an AGC speed control 36 in order to minimize airplane flutter when an airplane flight path is in the receiving path of the positioned antennas. Also, the microprocessor 32 can control a ghost canceller 38 and/or an adaptive equalizer 40 in order to cancel ghosts caused by multipath transmissions (reflections) when ghost producing geographical topography is effectively in the receiving path of the positioned antenna.

Moreover, when the microprocessor 32 causes the low VHF antenna 14, the high VHF antenna 16, and the UHF antenna 18 to be aimed at a transmitter corresponding to a selected channel, the microprocessor 32 calculates the received signal strength associated with the selected channel and adjusts the gain of the low noise, variable gain amplifier 26 appropriately. For example, the microprocessor 32 can store in its memory the known transmission powers of the transmitters whose locations are also stored in its memory. The microprocessor 32 can also calculate the distance between the RF receiver 10 and the transmitter corresponding to the selected channel based upon the stored location of this transmitter and the location of the receiver 10 as supplied by the global position sensor 34. The microprocessor 32 can then determine the received power based upon the stored transmitted power for that transmitter and the calculated distance. Thus, if the received power is too strong because the RF receiver 10 is close to the transmitter corresponding to the selected channel, the microprocessor 32 can reduce the gain of the low noise, variable gain amplifier 26. Conversely, if the received power is too weak because the RF receiver 10 is far from the transmitter corresponding to the selected channel, the microprocessor 32 can increase the gain of the low noise, variable gain amplifier 26.

Alternatively, optimum gain may be determined at installation by automatically adjusting the gain of the low noise, variable gain amplifier 26 as the antenna array 12 is aimed at each transmitter, and by storing the optimum gain for each transmitter in the memory of the microprocessor 32. Thus, when the low VHF antenna 14, the high VHF antenna 16, and the UHF antenna 18 are aimed at a transmitter, the microprocessor 32 retrieves the corresponding gain from memory and adjusts the gain of the low noise, variable gain amplifier 26 accordingly.

Certain modifications and alternatives of the present invention have been discussed above. Other modifications and alternatives will occur to those practicing in the art of the present invention. For example, the RF receiver 10 is provided with the antenna array 12 which includes the low VHF antenna 14, the high VHF antenna 16, and the UHF antenna 18. Instead, the antenna array 12 may include any combination of one or more of these antennas. Alternatively, the functions of the low VHF antenna 14, the high VHF antenna 16, and/or the UHF antenna 18 may be combined in fewer antennas, such as a single antenna.

Also, as described above, the RF receiver 10 includes the global position sensor 34 to supply the global position of the RF receiver 10 to enable the microprocessor 32 to calculate an angle of rotation for the motor 22. Instead, the global position sensor 34 may be eliminated from the RF receiver 10 by storing the global position of the RF receiver 10 in the memory of the microprocessor 32 such as at the time that the RF receiver 10 is installed.

Moreover, as described above, the position of an antenna is controlled based upon the global positions of the transmitter corresponding to a selected channel and of the RF receiver. Other arrangements may be provided, however, to aim an antenna at a transmitter corresponding to a selected channel. For example, the microprocessor 32 may store compass directions of the various transmitters servicing the RRF receiver 10. The microprocessor 32 may be arranged then to rotate the antenna to the stored compass direction corresponding to a selected channel, using a compass 42 as feedback during rotation of the antenna to the desired compass direction. Alternatively, the microprocessor 32 may be arranged to calculate the proper angle of rotation based upon the stored compass direction corresponding to the selected channel and upon the current reading of the compass 42, which is mounted so as to rotate with the antenna array 12. In any event, the stored compass directions may be input to the microprocessor 32 for storage at the time of installation by rotating each of the low VHF antenna 14, the high VHF antenna 16, and the UHF antenna 18 for each of the possible channels and noting the direction of the antenna at which reception is best for the corresponding channel.

As another example, the angles of rotation from a reference point can be computed at the time of installation for each transmitter by rotating each of the low VHF antenna 14, the high VHF antenna 16, and the UHF antenna 18 from the reference point to a position producing the best reception for the corresponding channel. Each angle of rotation so computed may then be stored in the memory of the microprocessor 32. Other similar arrangements are possible. This reference point can be periodically calibrated by reference to the compass 42 mounted so as to rotate with the antenna array 12. Alternatively, the reference point can be periodically calibrated by seeking the angle of rotation at which reception is best for a known transmitter. For this purpose, the known transmitter may correspond to the reference point. Gain can also be periodically calibrated by varying the gain of the low noise, variable gain amplifier 26 at each of the antenna positions and by re-storing in memory the gain corresponding to maximum signal strength for each of these positions.

In addition, the present invention has been described above in connection with aiming antennas at transmitters. Such transmitters may be ground-based transmitters or other sources of television and/or radio transmissions.

Moreover, as described above, the locations of the transmitters to which the antenna array 12 may be aimed are stored in the memory of the microprocessor 32. Instead, these transmitter locations could be transmitted by the transmitters to which the antenna array 12 is to be aimed.

Also, the compass 42 may be used for calibration. Accordingly, at the time of installation, the motor 22 is controlled so as to point the antenna array 12 in a specified direction, such as north, based upon a reading of the compass 42. The microprocessor 32 then uses this position as a reference position for subsequent calculations of rotation.

Furthermore, as described above, the low VHF antenna 14, the high VHF antenna 16, and the UHF antenna 18 are mechanically mounted on a common mast 20 so that, when the motor 22 is energized, the low VHF antenna 14, the high VHF antenna 16, and the UHF antenna 18 rotate in unison. Instead, the low VHF antenna 14, the high VHF antenna 16, and the UHF antenna 18 may be selectively coupled to the motor 22 in response to channel selection. Thus, when a channel is selected, only the antenna corresponding to the selected channel is coupled to the motor 22 which then rotates only that antenna. Alternatively, each of the low VHF antenna 14, the high VHF antenna 16, and the UHF antenna 18 may be provided with its own motor so that, when a channel is selected, only the motor coupled to the antenna corresponding to the selected channel is energized.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A system for automatically positioning an antenna comprising:

a motor arranged to be coupled to the antenna; and, a controller coupled to the motor, wherein the controller is arranged to control the motor in response to selection of a channel so as to automatically drive the antenna to a position at which the antenna is aimed at a source of a signal associated with the selected channel, wherein the controller operates the motor to drive the antenna to the position based upon a location of the signal source and a location of the antenna, wherein the controller is arranged to receive the signal from the positioned antenna and to process the received signal so as to improve reception of the received signal, and wherein the processing of the received signal is dependent upon the position.

2. The system of claim 1 wherein the controller stores a location of a known offending source, and where the controller processes the received signal by reducing reception of a signal from the known offending source based upon the stored location of the known offending source.

3. The system of claim 2 wherein the antenna has a reception path between the antenna and the signal source, and wherein the controller blocks reception of the signal from the known offending source only if the known offending source is effectively in the reception path between the antenna and the signal source.

4. The system of claim 2 wherein the controller includes an FM trap to notch out a signal from the known offending source.

5. The system of claim 1 wherein the controller includes a variable gain amplifier electrically coupled between the antenna and a receiver tuned to the channel selected by the user, wherein the controller processes the received signal by controlling the gain of the variable gain amplifier according to the location of the signal source so as to improve reception of the received signal.

6. The system of claim 1 wherein the location of the antenna is supplied by a global position sensor.

7. The system of claim 1 wherein the controller is arranged to operate the motor in response to a compass reading derived from a compass.

8. The system of claim 1 wherein the controller is arranged to cancel ghosts depending upon the position of the antenna.

9. The system of claim 1 wherein the antenna comprises first and second antennas, and wherein the controller is arranged to switch between the first and second antennas depending upon the channel selected by the user.

10. The system of claim 1 wherein the location of the signal source and the location of the antenna are global locations.

11. The system of claim 1 wherein the controller includes an FM trap to notch out a signal from the known offending source, and wherein the controller processes the received signal by controlling FM trap according to the location of the signal source so as to improve reception of the received signal.

12. The system of claim 1 wherein the controller processes the received signal by controlling a circuit in a signal processing path so as to improve reception of the received signal.

13. A method of automatically positioning an antenna having a motor coupled thereto comprising:

controlling the motor so as to drive the motor automatically in response to selection of a channel to a position at which the antenna is aimed at a source of a signal associated with the selected channel;

receiving a signal from the positioned antenna; and, processing the received signal so as to improve reception of the received signal, wherein the processing of the received signal is dependent upon the position.

14. The method of claim 13 further comprising storing a location of a known offending source, wherein the processing of the received signal comprises reducing reception of a signal from the known offending source based upon the stored location of the known offending source.

15. The method of claim 14 wherein the antenna has a reception path between the antenna and the signal source, and wherein the reducing of reception of a signal from the known offending source comprises blocking reception of the signal from the known offending source only if the known offending source is effectively in the reception path between the antenna and the signal source.

16. The method of claim 14 wherein the reducing of reception of a signal from the known offending source comprises notching out a signal from the known offending source.

17. The method of claim 13 wherein the processing of the received signal comprises controlling the gain of a variable gain amplifier according to the location of the signal source so as to improve reception of the received signal.

18. The method of claim 13 further comprising supplying the location of the antenna by way of a global position sensor.

19. The method of claim 13 wherein the controlling of the motor comprises driving the motor in response to a compass reading derived from a compass.

20. The method of claim 13 further comprising canceling ghosts depending upon the position of the antenna.

21. The method of claim 13 wherein the antenna comprises first and second antennas, and wherein the method further comprises switching between the first and second antennas depending upon the channel selected by the user.

22. The method of claim 13 wherein the location of the signal source and the location of the antenna are global locations.

23. The method of claim 13 wherein the processing of the received signal includes controlling an FM trap to notch out a signal from the known offending source according to the location of the signal source.

24. The method of claim 13 wherein the processing of the received signal comprises controlling a circuit in a signal processing path so as to improve reception of the received signal.

* * * * *